April 25, 1961 G. A. FRANK 2,980,991

WIRE SPACING DEVICE

Filed Sept. 26, 1958 4 Sheets-Sheet 1

INVENTOR
G. A. FRANK
BY W. J. Johnson
ATTORNEY

April 25, 1961 G. A. FRANK 2,980,991

WIRE SPACING DEVICE

Filed Sept. 26, 1958 4 Sheets-Sheet 2

INVENTOR
G. A. FRANK
By [signature]
ATTORNEY

INVENTOR
G. A. FRANK
By W. H. Robinson
ATTORNEY

April 25, 1961 G. A. FRANK 2,980,991
WIRE SPACING DEVICE
Filed Sept. 26, 1958 4 Sheets-Sheet 4

INVENTOR
G. A. FRANK
By W. R. Johnson
ATTORNEY

United States Patent Office 2,980,991
Patented Apr. 25, 1961

2,980,991

WIRE SPACING DEVICE

Gerard A. Frank, Allentown, Pa., assignor to Western Electric Company, Incorporated, New York, N.Y., a corporation of New York Filed Sept. 26, 1958, Ser. No. 763,655

3 Claims. (Cl. 29—203)

This invention relates to apparatus for spacing wires, particularly free ends of pairs of wires to serve as leads in electrical units such as transistors.

In the manufacture of transistors of the point contact type, pairs of wires must be processed in preparation for their contact with a semiconductor wafer. The processing steps include cutting two wires to predetermined lengths, forming S-bends in the wires, cutting free ends of the wires diagonally so that they may make point contacts with a wafer, spacing the free ends of the wires, moving the free ends of the wires into engagement with the wafer under predetermined pressure and imbedding the wafer and the ends of the wires, while held in point contacts with the wafer under pressure, in a plastic. During these various processing steps the wires are received by and held in jaws of successive holders which are used in each of the various steps and until the processed wires are imbedded in the plastic with the wafer.

The object of the present invention is an apparatus capable of receiving successive holders with pairs of partially processed wires and efficiently moving the holders to move the wires simultaneously until their free ends are spaced predetermined distances apart.

In accordance with the object the invention comprises a body having members to removably locate the holders successively at a given position relative to a feeler of conductive material and of a thickness equal to the desired spacing of the free ends of the wires and units electrically driven for moving the jaws until the free ends of the wires engage the feeler.

More specifically, the units are in reality micrometer units driven from starting positions by reversible motors controlled by electrical circuits including the wires and the feeler to immediately stop each unit by de-energizing each motor when the respective wire electrically contacts the feeler. The immediate stopping of the unit is the result of further controls in the circuits including the wires and the feeler to reverse the motors to cause them to return the units to the starting positions.

Other objects and advantages will be apparent from the following detailed description when considered in conjunction with the accompanying drawings, wherein.

Figure 1:
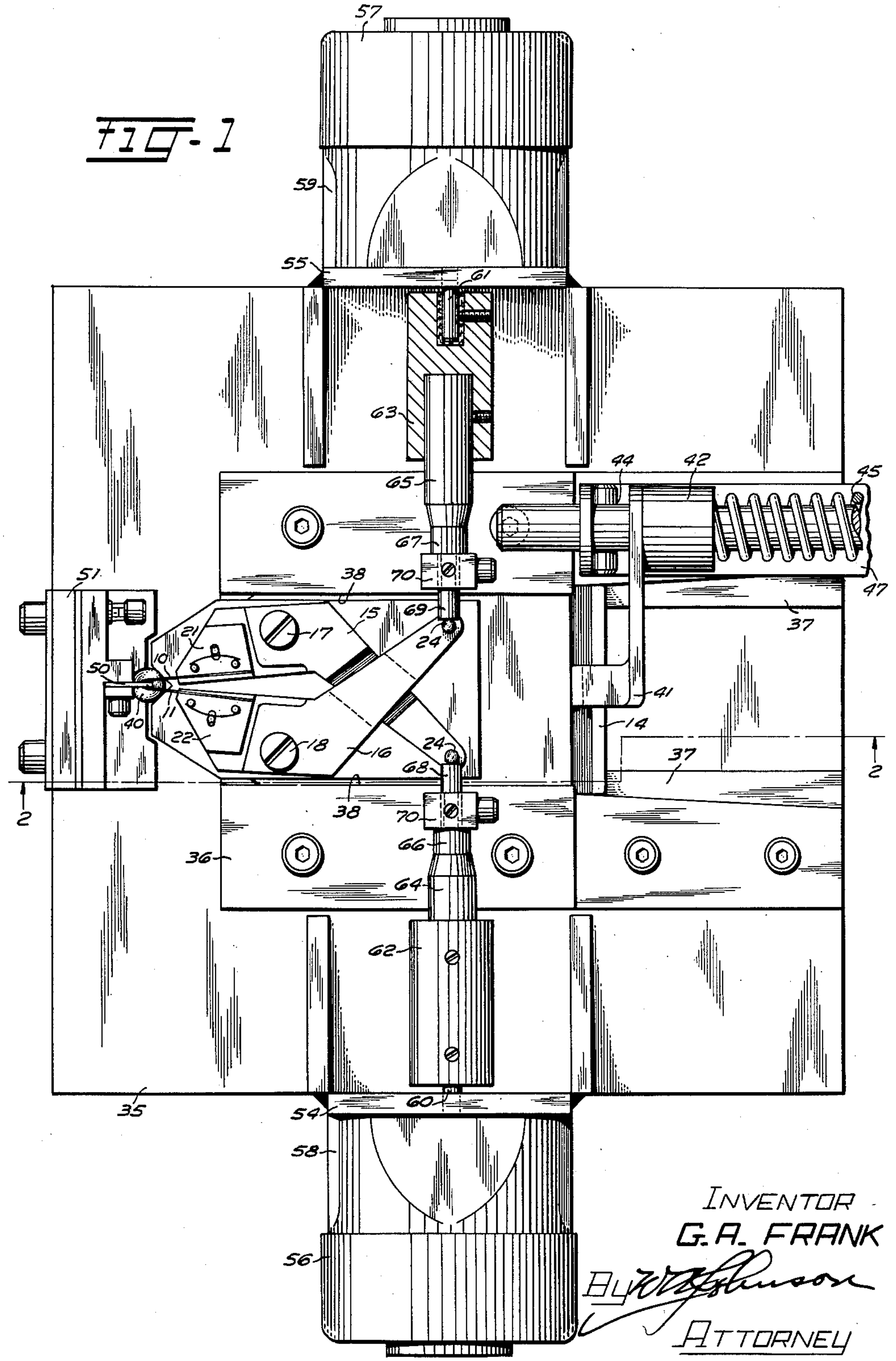
Fig. 1 is a top plan view of the apparatus.
Figure 2:
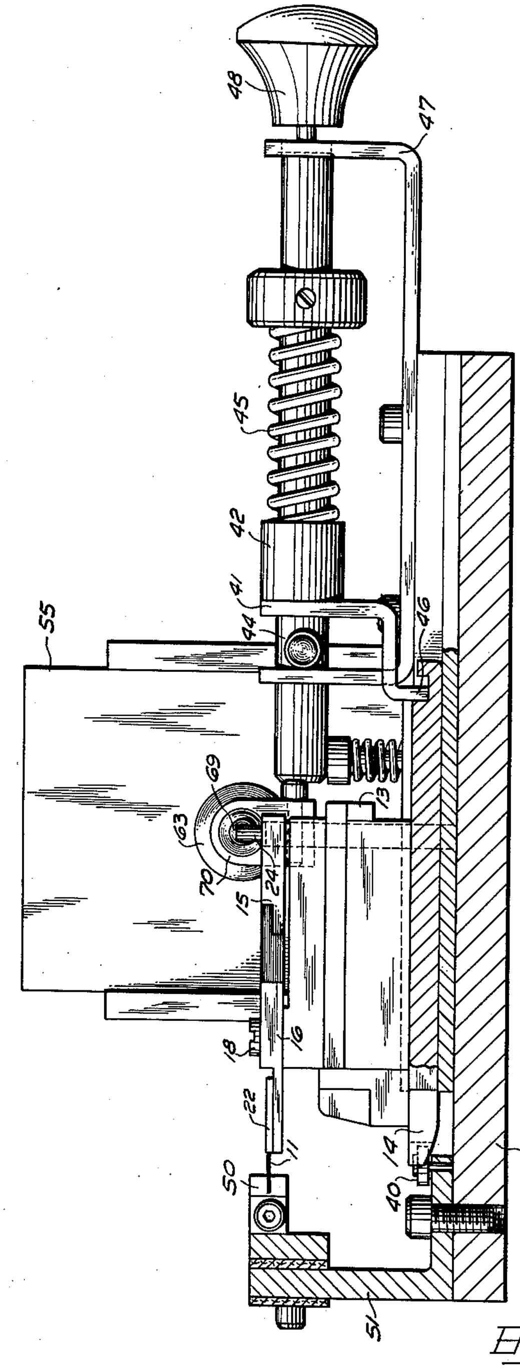
Fig. 2 is a vertical sectional view taken along the line 2—2 of Fig. 1.
Figure 6:
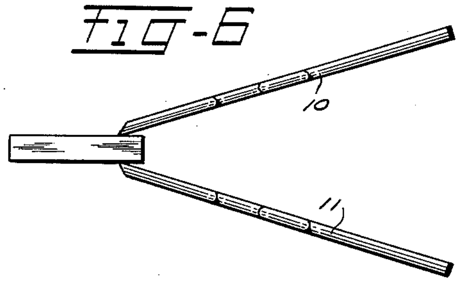
Fig. 6 is a top plan view of the wires having their free ends moved into spaced relation with each other.

The apparatus shown in Figs. 1 and 2 is for carrying out the method step, illustrated in Fig. 6, to accurately position the free ends of successive pairs of wires 10 and 11. Initially, the wires are fed to successive holders 12 illustrated in Fig. 3. The holders are identical and include a vertical support 13 fixed to a base member 14 on which levers 15 and 16 are pivotally mounted at 17 and 18. The pivots 17 and 18 are in the form of screws, holding the levers frictionally against accidental movement and requiring suitable force to pivot the levers into varied positions so that they will be held firmly in the adjusted positions. Initially, the levers 15 and 16 are positioned so that their fixed jaws 19 and 20 are parallel with each other to hold lengths of wires 10 and 11, through the cooperation with their spring pressed movable jaws 21 and 22, parallel with each other. The base member 14 has a V-shaped notch 23 in its forward end, while the rear most ends of the levers 15 and 16 have vertically extending pins 24 fixedly mounted thereon.

Figure 4:
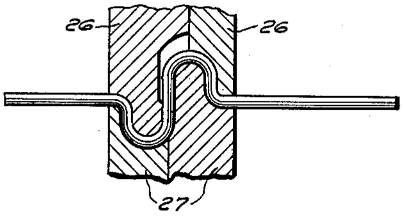
Fig. 4 is a side elevational view of the wires receiving the S-bends.
Figure 5:
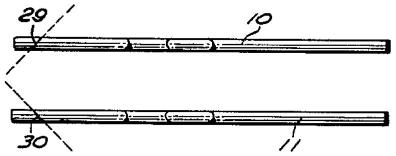
Fig. 5 is a top plan view illustrating the wires having their free ends cut diagonally.

The successive holders receive the lengths of wires 10 and 11 when disposed in an apparatus shown in applicant's co-pending application Serial No. 493,498, filed March 10, 1955, now Patent No. 2,935,774. Fig. 4 illustrates the use of pairs of forming tools 26 and 27 to form S-bends in the wires to produce flexible portions therein for longitudinal forces during point contact positioning of the wires. This forming of S-bends is illustrated more in detail in Patent 2,828,777 to G. A. Frank. In Fig. 5, as schematically illustrated, diagonal cuts are made at 29 and 30 in wires 10 and 11 to provide points for the wires. The apparatus shown in Figs. 1 and 2 is to accomplish movement of the wires 10 and 11 to position their free ends accurately relative to each other. Following the spacing of the wires as shown in Figs. 1, 2 and 6, the wires are forced longitudinally into engagement with a surface of a semiconductor wafer 31 carried by a conductive element 32 and, while thus positioned, the wafer with portions of the wires 10 and 11 are imbedded in a plastic 33 in a mold 34 described in Patent 2,820,983 of K. A. Schmuldt.

The apparatus shown in Figs. 1 and 2 includes a stationary base 35 having parallel guides 36 mounted on base 35 and having supporting portions 37 for each holder 12 and vertical surfaces 38 to guide each holder into its locating or operating position. This position is determined by a roller-like member 40 mounted on a vertical axis on the base 35 and positioned to engage the V-shaped notch 23 of the holder 12. An element 41, having one end fixed to a sleeve 42 mounted on a rod 44, is normally urged by a spring 45 so that its lower end 46 will engage the trailing end of the base member 14 of the holder 12 to force the holder until the V-groove 23 engages the member 40. The element 41 with its rod 44 is supported by bracket 47 which is mounted on one of the guides 37. A handle 48 on a reduced end of the rod 44 is utilized to move the element to free the holder for removal and to allow room for the insertion for another holder. A feeler 50 of conductive material is supported by and insulated from a bracket 51 mounted on the base 35 to position the feeler at a given location midway between the parallel planes of the surface 38. The feeler is of a given thickness which is equal to a critical dimension desired for the spacing of the free ends of the wires 10 and 11.

Suitable brackets 54 and 55 mounted on the base 35 support reversible motors 56 and 57 and their speed reducing units 58 and 59. Output shafts 60 and 61 of the units 58 and 59 are connected to sleeves 62 and 63 which are connected also to the outer shells 64 and 65 of their respective operating units. The operating units, in the present instance, are standard micrometer units, the inner workings of which, it is believed, need not be explained. They are composed of their outer shells 64 and 65 with intermediate members 66 and 67 and inner members 68 and 69 which are positioned to engage the pins 24 of the levers 15 and 16. Each of the inner members 68 and 69 has an element 70 holding the inner members against rotation but permitting them to move axially toward and away from the pins 24 of each holder 12.

Figure 9:
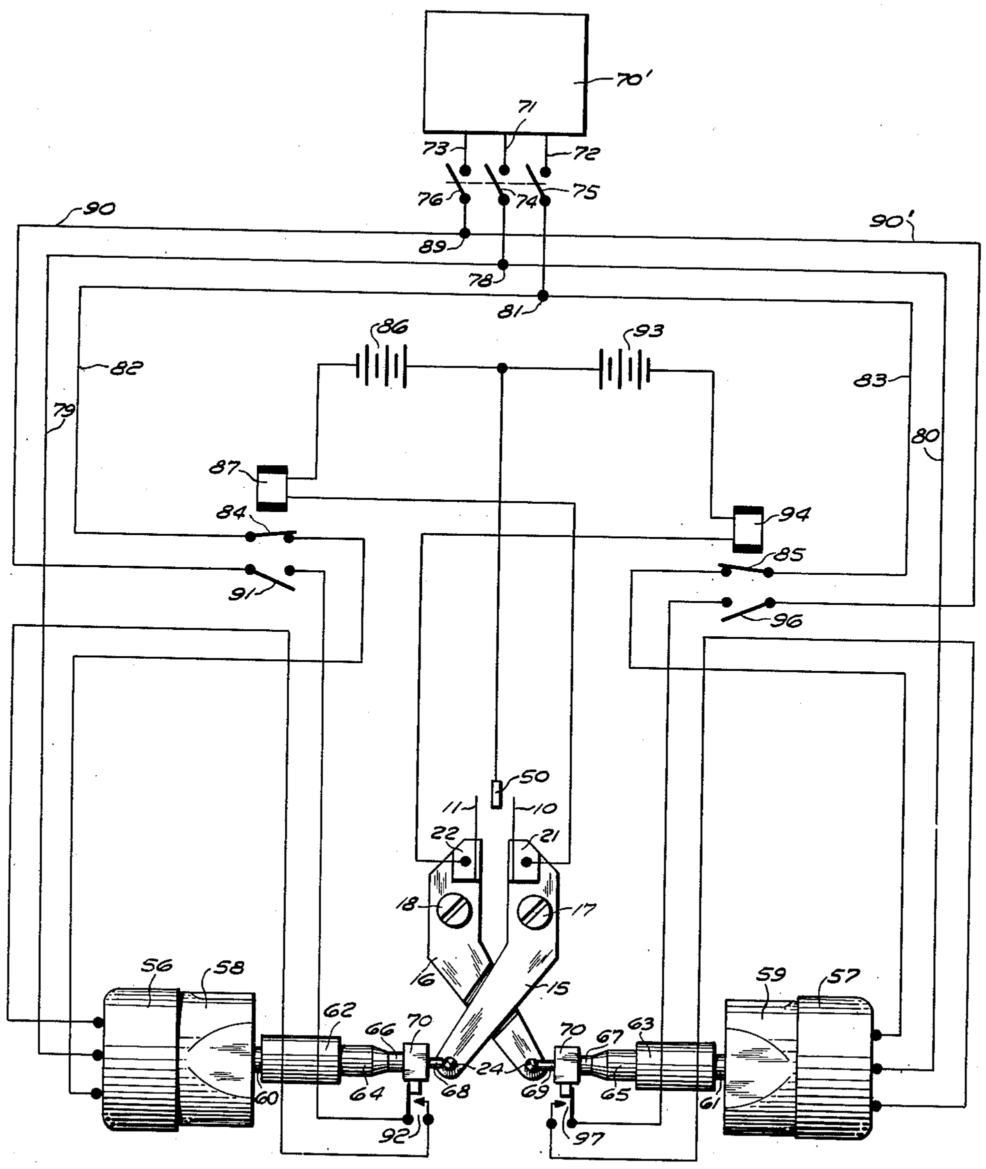
Fig. 9 is a wiring diagram of the circuits of the apparatus.

Attention is directed to Fig. 9 illustrating the control circuits for the apparatus. Numeral 70' represents a source of electrical energy for the motors including lines 71, 72 and 73 which may be closed to the motor circuits by tandem switches 74, 75 and 76. Line 71 through switch 74 is connected at 78 to lines 79 and 80 for the motors 56 and 57, respectively. Line 72 through switch 75 is connected at 81 to lines 82 and 83 which are normally completed through closed contacts 84 and 85 to their motors 56 and 57 to drive the motors and the micrometer units to move the jaws of the holder until their respective wires 10 and 11 electrically contact the feeler 50. When this is accomplished, relay circuits are closed. For example, when wire 10 electrically contacts the feeler 50, a circuit is completed from battery 86 through relay 87, wire 10, feeler 50 and back to the battery 86. This circuit is closed and held closed until the motor 57 returns its micrometer unit to its starting position. Energization of relay 87 opens contact 84 of the forward driving circuit and closes contact 91 to complete a reverse driving circuit from line 73 through its switch 76, connection 89, line 90, closed contact 91, normally closed switch 92, the reverse winding of the motor 56 and back through line 79, switch 74 and line 71. After each holder 12, with wires 10 and 11, is located in the apparatus and the switches 74, 75 and 76 are closed, circuits are completed from 70 through lines 71 and 72 to the motors 56 and 57 to drive the motors to operate the micrometer units to cause their inner members 68 and 69 to move their respective levers of the holder 12 until the wires electrically contact the feeler 50. The moment the micrometer units move from their starting positions the switches 92 and 97 are permitted to close conditioning the reversing circuits so that when the relays 87 and 94 are energized, the forward circuits for the motors are opened immediately and at the same time the reversing circuits are closed to drive the motors in reverse directions to move the micrometer units back to their starting positions where they will open the switches 92 and 97 to de-energize the motor. At this time the tandem switches 74, 75, and 76 are opened. A reverse driving circuit for motor 57 is under the control of the wire 11, a battery 93, the relay 94. Energization of the relay 94 opens its contact 84 and closes its contact 96 to complete a circuit to reverse the motor 57. This circuit is from line 73, switch 76, line 90', closed contact 96, closed switch 97, the reverse winding of motor 57, line 80, connection 78, switch 74 to line 71.

*Operation*

Figure 3:
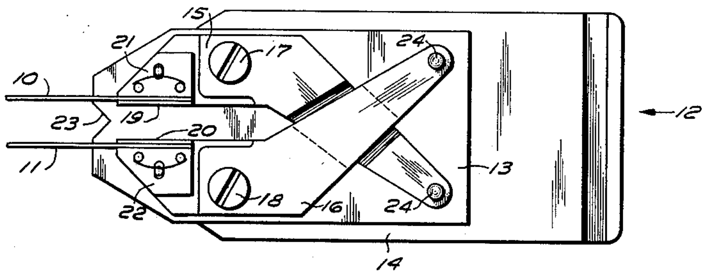
Fig. 3 is a top plan view of one of the holders with lengths of wire held in the jaws thereof.
Figure 7:
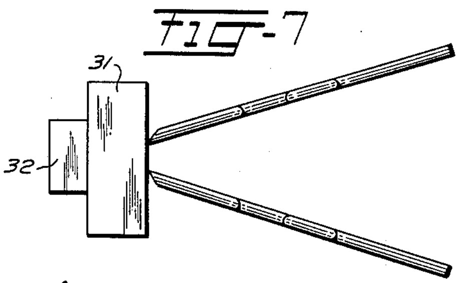
Fig. 7 is a top plan view of the wires being moved into point contact with a wafer.
Figure 8:
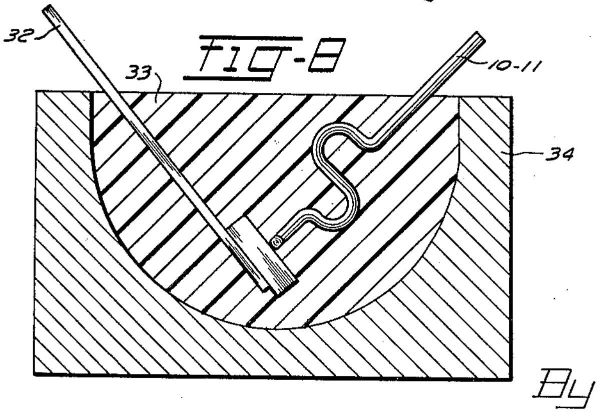
Fig. 8 is a side elevational view of the wires held in contact with the wafer being partially imbedded in a plastic.

The holders 12, a multiplicity of which are used in succession in the previous processing steps illustrated in Figs. 3, 4 and 5 and also used in the subsequent processing steps illustrated in Figs. 7 and 8, are placed successively in the apparatus shown in Figs. 1 and 2, and located accurately therein with their wires 10 and 11 located parallel with each other. When the holder is held against the locating element 40 by the element 41, the pins 24 of the levers 15 and 16 are positioned adjacent the inner ends 68 and 69 of the units. At this time, the tandem switches may be closed to energize the motors 56 and 57 in their forward driving operations to move the inner members 68 and 69 toward each other and to move the levers 15 and 16 about their pivots 17 and 18 simultaneously. If the free ends of the wires are mounted like distances upon each side of the centerline of the holder, it is presumed that they will electrically contact their respective faces of the feeler 50 simultaneously. However, regardless of this fact, the free ends of the wires will be positioned accurately in that they will be moved through the energization of their motors until electric contact of the wires 10 and 11 with the feeler 50 closes their respective relay circuits to immediately open the normally closed contacts 84—85 and close the normally open contacts 91—96 for de-energizing for the forward drives of the motors and energizing the reverse drives thereof. This action not only stops the forward movement of the inner members 68 and 69 of the units instantaneously, but moves them away from their respective pins 24, back to their starting positions controlled by the switches 92 and 97 to de-energize their motors. At this time the tandem switches are open and the holder and located wires removed. Each holder, through the binding or frictional connections between the pivots 17 and 18 and their levers 15 and 16, will hold the wires accurately positioned and spaced from each other so that they may be removed with their holders from the apparatus and the holders utilized for the additional processing steps.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for spacing free ends of pairs of wires held short of the free ends initially parallel with each other in relatively movable jaws of holders, the apparatus comprising a body, members mounted on the body to support and removably locate the holders successively at a given position, a feeler of conductive material of a thickness and having opposite sides spaced distances equal to the desired spacing of the free ends of the wires in each pair, means fixedly mounted on the body and electrically insulated therefrom to support the feeler at a position where the free ends of each pair of wires will be located on their respective sides of the feeler, a drivable unit for each jaw supported by the body and located normally at a starting position to engage its respective jaw of the holder supported by the members, a reversible motor energizable to drive each unit forwardly from and reversely back to the starting position, forward and reverse circuits for the motors, means to close the forward circuits to cause the motors to drive the units forwardly to move the jaws to move the free ends of their respective wires toward and to electrical contact with their sides of the feeler, and controls in electrical circuits respectively including each wire and the feeler to open each forward circuit and close each reverse circuit to thereby stop movement of each jaw the instant its wire electrically contacts the feeler and cause the motors to drive the units back to their starting positions.

2. An apparatus for spacing free ends of pairs of wires held short of the free ends initially parallel with each other in relatively movable jaws of holders, the apparatus comprising a body, members mounted on the body to support and removably locate the holders successively at a given position, a feeler of conductive material of a thickness and having opposite sides spaced distances equal to the desired spacing of the free ends of the wires in each pair, means fixedly mounted on the body and electrically insulated therefrom to support the feeler at a position where the free ends of each pair of wires will be located on their respective sides of the feeler, a drivable unit for each jaw supported by the body and located normally at a starting position to engage its respective jaw of the holder supported by the members, a reversible motor energizable to drive each unit forwardly from and reversely back to the starting position, forward and reverse circuits for the motors, means to close the forward circuits to cause the motors to drive the units forwardly to move the jaws to move the free ends of their respective wires toward and to electrical contact with their sides of the feeler, means in electrical circuits respectively including each wire and the feeler to open each forward circuit and close each reverse circuit to thereby instantly stop movement of each jaw when its wire electrically contacts its side of the feeler, the reverse circuits causing the motors to drive the units back to their starting positions, and normally closed switches in the reverse circuits actuated into open positions by the units returning to their starting positions to de-energize the motors and thereby locate the units at their starting positions.

3. An apparatus for spacing free ends of pairs of wires held short of the free ends initially in positions parallel with each other in relatively movable jaws of holders, the apparatus comprising a body, members mounted on the body to support and removably locate the holders successively at a given position, a feeler of conductive material of a thickness and having opposite sides spaced distances equal to the desired spacing of the free ends of the wires in each pair, means fixedly mounted on the body and electrically insulated therefrom to support the feeler at a position where the free ends of each pair of wires will be located on their respective opposite sides of the feeler, an operable unit for each jaw supported by the body at spaced positions relative to each other and their respective jaws and operable from starting positions, an electrically operable drive for each unit supported by the body, means including electrical circuits for the drives to energize the electrical drives to cause them to operate their units from their starting positions to move their respective jaws of the holder until the free ends of the wires held thereby engage their respective sides of the feeler, and an electrical control for each electrically operable drive including each wire and the feeler rendered effective to stop each drive and its operable unit when its respective wire engages the feeler.

References Cited in the file of this patent

UNITED STATES PATENTS

| | | |
|---|---|---|
| 2,554,982 | Hartley | May 29, 1951 |
| 2,690,532 | Johnson | Sept. 28, 1954 |
| 2,757,440 | Carman | Aug. 7, 1956 |
| 2,772,416 | Dorosz | Dec. 4, 1956 |
| 2,853,769 | Stahl | Sept. 30, 1958 |